June 1, 1954
L. HITCHCOCK
2,679,847
CORN CUTTING MACHINE
Filed Dec. 21, 1950
3 Sheets-Sheet 1
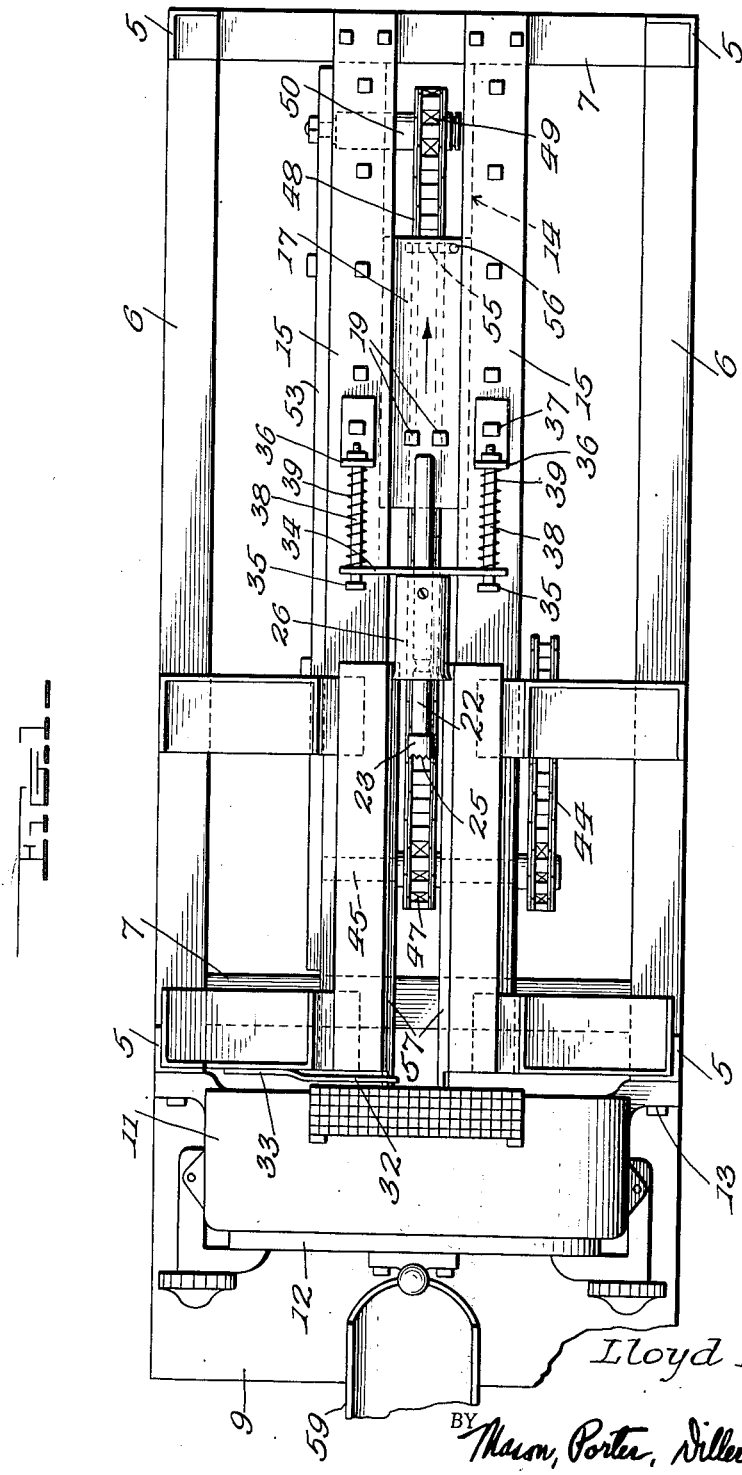
INVENTOR
*Lloyd Hitchcock*
BY *Mason, Porter, Diller & Stewart*
ATTORNEYS

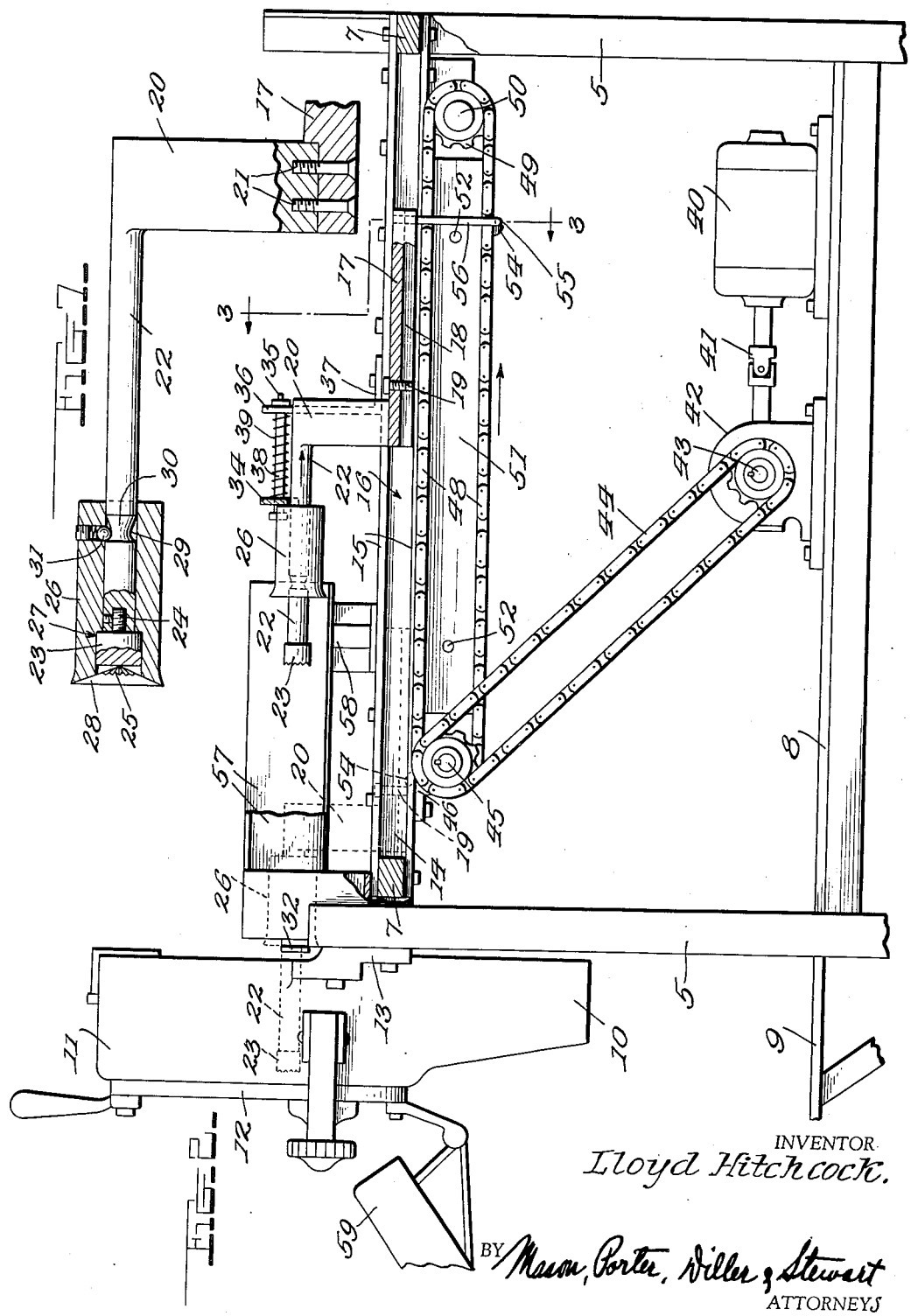

June 1, 1954  L. HITCHCOCK  2,679,847
CORN CUTTING MACHINE
Filed Dec. 21, 1950 3 Sheets-Sheet 3
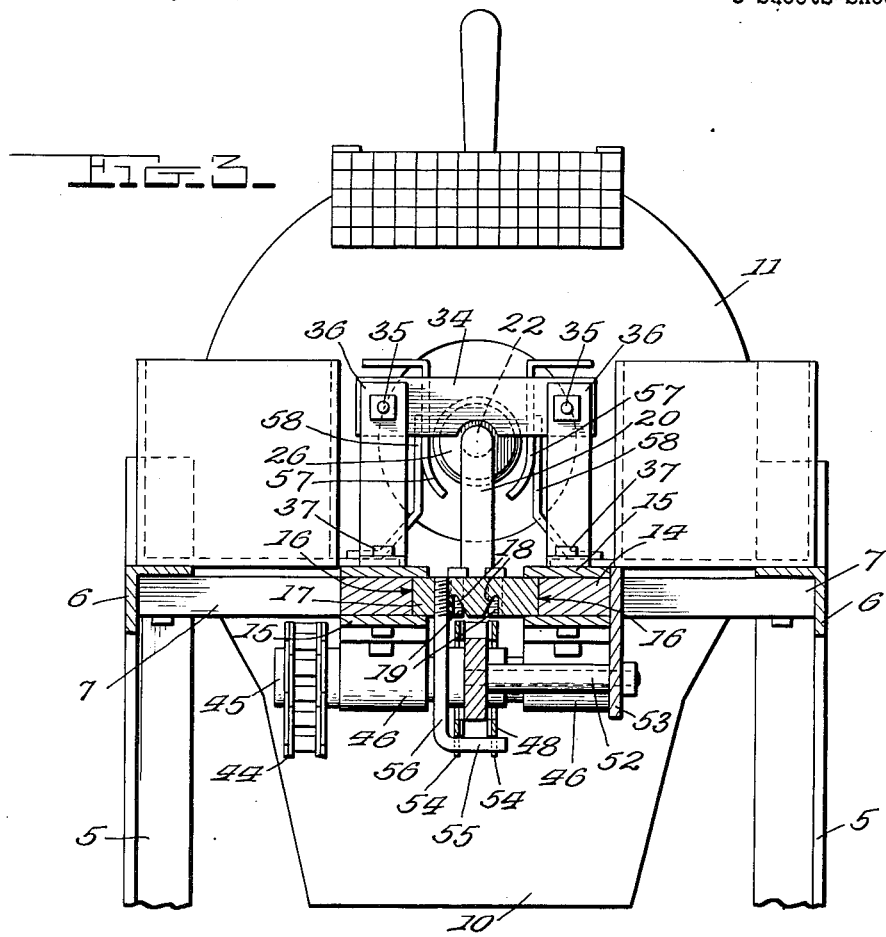
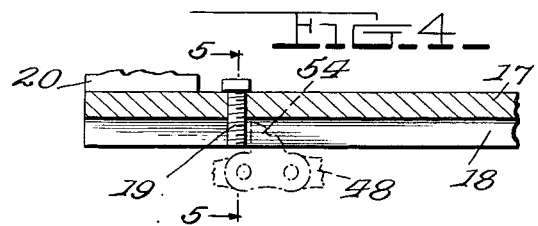
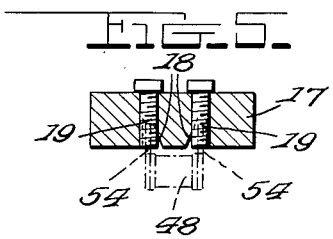
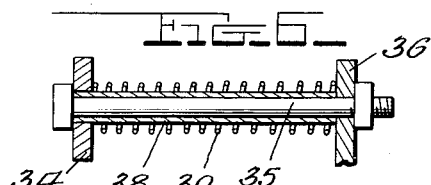
INVENTOR
Lloyd Hitchcock,
BY Mason, Porter, Diller & Stewart
ATTORNEYS Patented June 1, 1954

2,679,847

UNITED STATES PATENT OFFICE 2,679,847

CORN CUTTING MACHINE

Lloyd Hitchcock, Athens, Ga., assignor to Dixie Canner Company, Athens, Ga., a corporation of Georgia Application December 21, 1950, Serial No. 202,113

4 Claims. (Cl. 130—9)

The invention relates generally to corn cutting machines in which the corn ears are fed in the direction of their length through cutting devices effective to cut the green kernels from the cobs, and it primarily seeks to provide novel and efficient means for receiving and placing the corn ears and for feeding them one after another to and through the cutting devices.

An example of a cutting machine of the kind referred to is to be found in U. S. Letters Patent 2,332,894 issued October 26, 1943, to Ralph Cover, and an example of cutter head structure for use in such machines and to and through which the feeder devices herein covered are designed to feed the corn ears is to be found in the U. S. Letters Patent 2,216,065 issued September 24, 1940, to the said Ralph Cover. It is a purpose of the present invention to provide a novel corn ear feeding means into which the corn ears are manually placed and fed one after the other in the direction of their axes by a pusher which is reciprocated through the medium of a continuously driven endless chain, a guided slide, and drive connections which convert the orbital movement of a chain carried driver into straight line reciprocation of the slide and pusher.

Another object of the invention is to provide a feeding means of the character stated in which the pusher includes a pusher rod disposed to engage corn ears at their axes at one end, a pusher sleeve surrounding and slidable along the pusher rod, releasable detent and groove means normally effective to cause the sleeve to move with the rod with the corn ear engaging rod and sleeve ends in cooperative relation, abutment means engageable by the sleeve after an ear has been moved up to and into the cutter devices to arrest the movement of the sleeve and allow the rod alone to continue the pushing of the ear through the cutter devices, and other abutment means effective upon retraction of the pusher to engage the sleeve and arrest its movement in a manner for restoring the same to its initial detent retained position at the advance end of the pusher rod.

With the above and other objects in view that will hereinafter appear, the nature of the invention will be more clearly understood by reference to the following detailed description, the appended claims and the several views illustrated in the accompanying drawings.

In the drawings:

Figure 1 is a plan view illustrating a corn cutting machine embodying the invention.

Figure 2 is an enlarged side elevation illustrating the machine shown in Figure 1, parts being in central longitudinal section.

Figure 3 is a vertical cross section taken on the line 3—3 on Figure 2.

Figure 4 is an enlarged fragmentary vertical longitudinal section illustrating the relation of the chain driver lugs to the abutment means on the slide, the chain fragment being shown in dot and dash lines.

Figure 5 is a vertical cross section taken on the line 5—5 on Figure 4.

Figure 6 is an enlarged detail vertical longitudinal section taken through one of the rear abutment bar supporting chain mountings.

Figure 7 is an enlarged fragmentary vertical longitudinal section illustrating the mounting of the corn ear pusher head and the surrounding slidably mounted sleeve.

In the example of embodiment of the invention herein disclosed, there is included a frame structure having corner uprights or legs 5, horizontal side top rails 6 and connecting traverse bars 7. An intermediate shelf structure 8 is supported by the corner uprights 5, and the shelf may be extended as at 9 to support a suitable receptacle for catching kernels cut from corn ears and falling through the discharge throat 10 of the corn cutter casing 11 to which the corn cutter head generally designated 12 is attached and which is in turn mounted as at 13 on the uprights 5 at one end of the machine.

Longitudinal guide bars 14 are mounted in parallel spaced relation between the traverse bars 7 in the manner clearly illustrated in Figures 1 and 3 of the drawings, and upper and lower guide plates 15 are secured to the bars 14 and project inwardly therefrom to provide slide guides at 16 for the slide block 17. It will be apparent by reference to Figures 2 through 5 that the slide block 17 is provided with parallel grooves along its bottom face, and abutment means 19 traverse the grooves in position for being contacted by driver lugs on a conveyor chain to be described hereinafter. The abutment means may take any approved form, and in the present illustration are in the nature of screws directed downwardly into the longitudinal grooves 18.

A standard 20 is secured as at 21 to the slide block 17 to project uprightly therefrom, and said standard has a horizontal pusher extension on rod 22 projecting forwardly therefrom. The pusher rod 22 preferably is cylindrical in cross section, and an enlarged pusher head 23 is removably secured to the front end thereof as at 24. See Figure 7. The front or corn ear abutting face of the head 23 is serrated as at 25 to facilitate corn ear engagement in a manner for preventing rotation of the ear as it is forced through the cutting blades. A cylindrical sleeve 26 is slidably mounted on the pusher rod 22 and is counterbored as at 27 to form an abutment end for the pusher head 23. The sleeve is equipped at its front end with a bell mouth or conical recess 28 in order to facilitate the engagement and centering of corn ears as they are being pushed through the cutter head, and it will be apparent by reference to Figure 7 that when the sleeve is in its effective or corn ear pushing position on the rod 22, as illustrated in Figure 7, the pusher head 23 of the rod will be seated in the sleeve counterbore 27, and the corn ear pushing surfaces at the ends of the sleeve 26 and the pusher head 23 will be flush or in register. The pusher rod 22 is provided with an annular recess 29 which includes a camming surface 30 which slopes gradually toward the rear in the manner clearly illustrated in Figure 7. It will also be apparent by reference to Figure 7 that the recess 29, 30 is so placed with relation to the end of the rod 22 as to be disposed within the sleeve when the sleeve is in the normal or corn ear pushing position illustrated in Figure 7. A spring pressed detent 31 provided on the sleeve 26 normally engages in the rod recess 29, 30 and yieldably retains the sleeve 26 in the effective position illustrated in Figure 7.

A front abutment member 32 is provided and is supported at 33 to project into the path of movement of the sleeve 26. A rear abutment bar 34 also is provided and is apertured to be slidable on supporting pins 35 projecting from supporting brackets 36 which are mounted as at 37 on the guide plates 15. See Figures 1, 2 and 6. The rear abutment bar 34 is disposed in the manner illustrated in Figures 2 and 3 so as to lie in the path of movement of the sleeve 26 as it is being retracted with the pusher rod 22. It will be apparent by reference to Figure 6 that spacer sleeves 38 surround the mounting pins 35 and extend through the apertures in the abutment bar 34. Compression springs 39 interposed between the brackets 36 and the bar 34 constantly tend to hold the bar against the abutment heads at the front ends of the pins 35, but it will be apparent by reference to Figure 2 that the springs will permit the bar 34 to yield as necessary when the sleeve 26 comes against the same during retraction of the slide 17 and the pusher rod 22.

A motor 40 is supported on the shelf structure 8 and is drive coupled as at 41 with a speed reducer means generally designated 42 and also supported on said shelf structure. The output shaft 43 of the speed reducer means is sprocket and chain connected as at 44 with a driver shaft 45 which is rotatably supported in bearings 46 depending from the guide bars 14. The driver shaft 45 has a sprocket 47 thereon which drives a chain 48 also passing over a sprocket 49 having rotative bearing on a stud shaft 50. The chain 48 also is supported and guided by a bar 51 which is mounted as at 52 on the frame plate 53. See Figures 2 and 3.

Driver lugs 54 project from the chain 48 for engagement with the previously mentioned abutment means 19 extending downwardly into the longitudinal grooves 18 in the bottom face of the slide block 17. The abutment member 55 carried by the slide block also is engaged by the driver lugs 54, and it will be apparent by reference to Figures 2 and 3 of the drawings that said abutment member is in the form of an angle bent lower end portion of a standard 56 depending from said slide block.

Corn ear receiving wings 57 are supported on mounting brackets 58 in the manner clearly illustrated in Figures 1 to 3 of the drawings, and a cob chute 59 may be provided for receiving the corn cobs after the kernels have been cut therefrom as the ears are pushed through the cutter head 12.

When the motor 40 is in operation, continuous travel will be imparted to the conveyor chain 48, and the driver lugs will be caused to follow the orbital path clearly illustrated in Figure 2. As the lugs are moving along with the upper flight of the chain, they will contact the slide abutment means 19 in the manner clearly illustrated in Figures 4 and 5 and will move the slide forwardly in its guide 16. The limit of advance movement of the slide is illustrated in dotted lines in Figure 2, and the driver lugs 54 are indicated in dotted lines as about to pass out of contact with the abutment means 19. Prior to reaching this position, the advance end or bell mouth 28 of the sleeve 26 will have contacted the front abutment 32 and will have been held against additional forward movement by said abutment, allowing the rod and the pusher head 23 to continue on to the forward limit of their travel as indicated in dotted lines in Figure 2. This permits the relatively small pusher head 23 to push the corn ear all the way through the blades of the cutter head 12, and it will be apparent that when the sleeve 26 strikes the abutment 32 and has its forward movement thus arrested, the detent 32 will ride up the cam surface 30 and permit the described relative forward movement of the pusher rod 22.

As the driver lugs 54 pass around the sprocket 47, they will move out of contact with the slide abutment means 19 and then travel along with the lower flight of the chain 48, coming in contact with the depending abutment member 55 and serving to retract the slide block 17 in the manner clearly illustrated in full lines in Figure 2. During the retraction of the slide block 17 the sleeve 26 will come against the yieldable abutment bar 34 and be held against additional rearward movement thereby during completion of the retraction of the pusher rod 22 so as to restore the sleeve to its normal position illustrated in Figure 7. It is to be understood that each time the pusher devices are fully retracted the operator will manually place an ear of corn in the guides or wings 57 to be engaged during the next forward travel of the pusher devices and pushed thereby through the cutter head 12.

While one form of the invention has been shown for purposes of illustration, it is to be clearly understood that various changes in the details of construction and arrangement of parts may be made without departing from the spirit and scope of the invention as defined in the appended claims.

I claim:

1. In a corn cutting machine, a frame, a cutter head mounted on the frame, means for supporting corn ears for being pushed in the direction of their length through the cutter head for having the kernels cut from the cobs, pusher means, and means for reciprocating the pusher means for pushing corn ears from the supporting means through the cutter head and then withdrawing to clear said supporting means, there being also included a slide on which the pusher means is supported, and guides on the frame for guiding the slide for straight line movement, said reciprocating means including an endless chain having upper and lower flights disposed to travel in a vertical plane with an upper forwardly travelling, slide advancing flight, and a lower rearwardly travelling slide retracting flight, means for driving the chain, driver lug means on the chain, a pin fixed on the slide and rigidly depending therefrom in position for being engaged by the driver lug means only while it is travelling in said upper flight, and a pin fixed on the slide and rigidly depending therefrom in a plane to one side of the plane in which the chain travels and having an angle bent end portion positioned for being engaged by the driver lug means only while it is travelling in said lower flight.

2. In a corn cutting machine, a frame, a cutter head mounted on the frame, means for supporting corn ears for being pushed in the direction of their length through the cutter head for having the kernels cut from the cobs, pusher means, and means for reciprocating the pusher means for pushing corn ears from the supporting means through the cutter head and then withdrawing to clear said supporting means, said pusher means including a small diameter pusher rod and a pusher sleeve slidably surrounding the rod, said rod and sleeve having end portions shaped to cooperatively engage an ear of corn at an end thereof, means yieldably securing the sleeve to move with the rod, and abutment means engageable by said sleeve upon projection and retraction of the rod and effective on the forward stroke after the sleeve has been moved close to but short of the cutter head to arrest further movement of the sleeve and allow the rod alone to continue the corn ear pushing function, and upon retraction of the rod to engage the sleeve and return it to its initial position on the rod with the shaped rod and sleeve ends in the initially stated cooperative relation, said abutment means comprising a fixed abutment engageable by the sleeve on the advance movement of the pusher rod just before the sleeve reaches the cutter head, and a spring opposed yieldable abutment engageable by the sleeve just prior to complete retraction of the pusher rod and disposed to yield a limited amount upon impact of the sleeve, and position determining head means engageable by the spring opposed abutment means as it is returned after sleeve impact to accurately place the sleeve with relation to the pusher rod.

3. In a corn cutting machine, a frame, a cutter head mounted on the frame, means for supporting corn ears for being pushed in the direction of their length through the cutter head for having the kernels cut from the cobs, pusher means, and means for reciprocating the pusher means for pushing corn ears from the supporting means through the cutter head and then withdrawing to clear said supporting means, there being also included a flat horizontally disposed slide on which the pusher means is supported, and guides on the frame for guiding the slide for straight line movement, said reciprocating means including an endless chain, means for driving the chain with an upper flight travelling in the direction of advance movement of the pusher means and a lower flight travelling in the direction of retraction of the pusher means, driver lug means on the chain, said slide having a grooveway in its bottom surface through which said lug means passes, a first abutment means on the slide depending into the slide grooveway in position for being engageable by the lug means only while it is travelling in said one flight for positively imparting advance movement of the slide and pusher means, and a second abutment means depending from the slide beside both chain flights and turned horizontally under the lower chain flight in position for being engaged by the chain lug means only while it is travelling in said lower flight for positively imparting movement of retraction of the slide and pusher means.

4. Corn cutting machine structure as defined in claim 3 wherein the first abutment means comprises screw means threaded downwardly through the slide into the bottom grooveway therein.

References Cited in the file of this patent

UNITED STATES PATENTS

| Number | Name | Date |
|---|---|---|
| 364,441 | Rohlmann | June 7, 1887 |
| 1,334,162 | Moltzner | Mar. 16, 1920 |
| 1,977,188 | Kunz | Oct. 16, 1934 |
| 2,029,344 | Sheldon | Feb. 4, 1936 |
| 2,144,567 | Fetterman | Jan. 17, 1939 |
| 2,216,065 | Cover | Sept. 24, 1940 |
| 2,332,894 | Cover | Oct. 26, 1943 |
| 2,412,079 | Brustowsky | Dec. 3, 1946 |